United States Patent Office

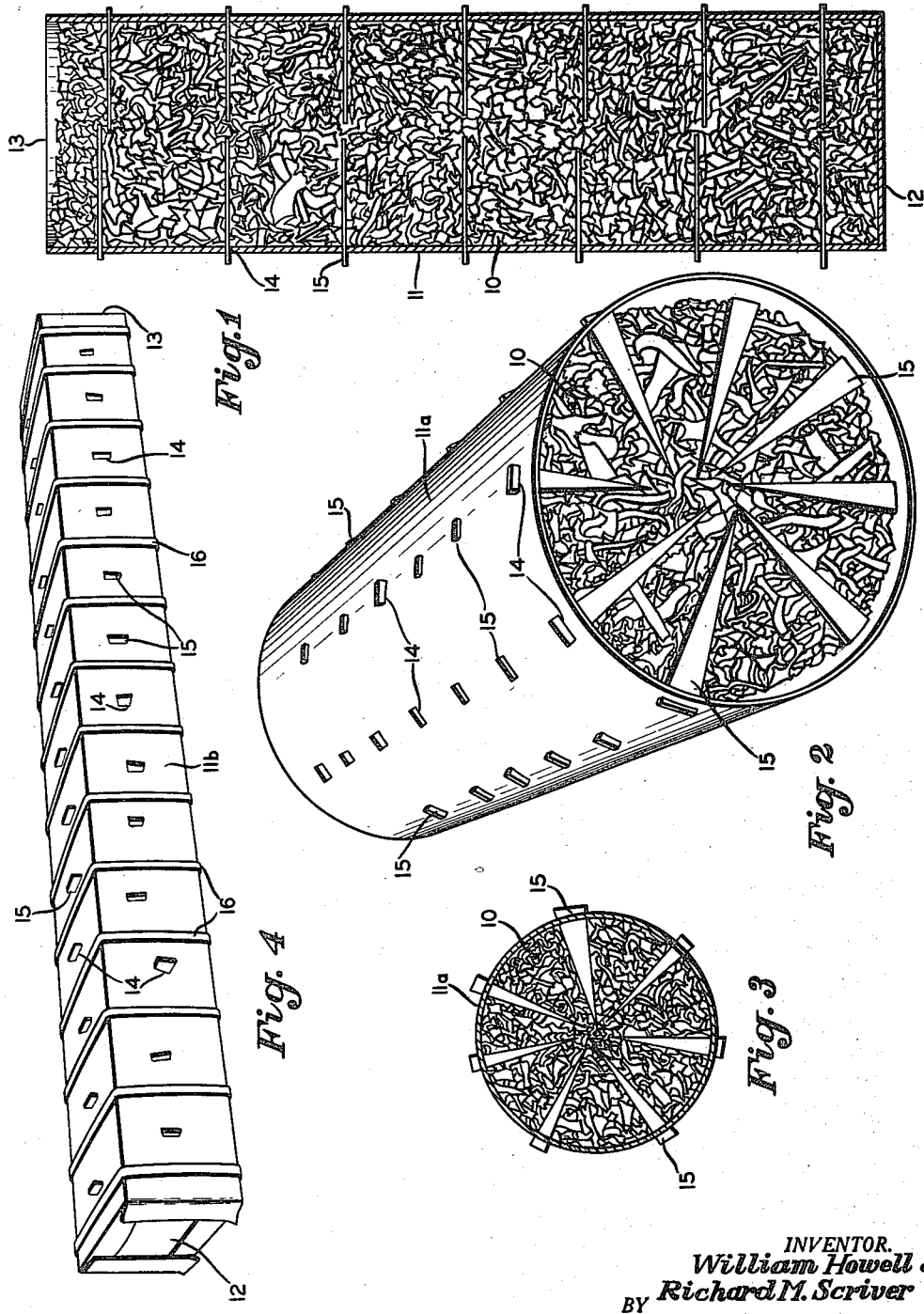

2,867,895
Patented Jan. 13, 1959

2,867,895

TITANIUM SCRAP RECOVERY AND ELECTRODE MANUFACTURE

William Howell, Warren, and Richard M. Scriver, North Jackson, Ohio, assignors to Mallory-Sharon Metals Corporation, a corporation of Delaware Application August 19, 1955, Serial No. 529,517

2 Claims. (Cl. 29—184)

The invention relates to the recovery of titanium scrap of various sizes, shapes and character, and to the manufacture therefrom of consumable titanium electrodes for use in the production of titanium ingots, and especially to the construction of such electrodes and the method of making the same.

In the manufacture of titanium sheets, bars and the like, and the fabrication of various articles therefrom, there is a considerable amount of resulting scrap in pieces of various sizes and shapes. Also, in the production of titanium ingots, and the processing of the same, a certain amount of titanium scrap is accumulated in the form of skulls and chips.

Since titanium is a valuable metal, this titanium scrap has a substantial value, and it is important for economic reasons that it be utilized to the best possible advantage. However, the characteristics of titanium and the manner in which ingots are produced therefrom, do not permit of the use of titanium scrap in the same manner in which other metal scrap is recovered.

It is known that methods have been developed for the recovery of certain types of titanium scrap, but no method has heretofore been devised for using such titanium scrap comprising pieces of various sizes, shapes and character.

Therefore, a primary object of the present invention is the recovery and utilization of pieces of titanium scrap of all sizes, shapes and character.

Another object is to provide a method of making consumable titanium electrodes for use in the production of titanium ingots, by forming such electrodes from pieces of titanium scrap of various sizes, shapes and character.

A further object is the production of a consumable titanium eletcrode by such method.

A still further object is the provision of a method of manufacturing a titanium electrode which consists in providing an elongated can or container of sheet titanium, packing pieces of titanium scrap of various sizes, shapes and character into said can, and holding said pieces of titanium scrap in place within the can by means of spikes of titanium sheet or plate material driven through slots in the sides of the can and extending substantially radially throughout the mass of titanium scrap therein.

Another object of the invention is to provide a consumable titanium electrode comprising a mass of titanium scrap of all sizes, shapes and character, packed within an elongated titanium can and held therein by spikes.

Still another object lies in the provision of a method of making consumable titanium electrodes from titanium scrap which readily permits the use of scrap of varied shapes, sizes and character.

Finally, it is an object of the invention to provide a method of making consumable titanium electrodes from various kinds of titanium scrap which does not affect, and is not affected by, the characteristics of titanium, and which can be easily and economically carried out for the recovery and utilization of titanium scrap.

The above and other objects and advantages, apparent to those skilled in the art from the following description, are accomplished and may be attained by the parts, constructions, arrangements, combinations, sub-combinations, methods, steps, operations and procedures which comprise the present invention, the nature of which is set forth in the following general statement, preferred structural and procedural embodiments of which, illustrative of the best modes in which applicants have contemplated applying the principles, are set forth in the following detail description, and which are particularly and distinctly pointed out in the appended claims forming part hereof.

The nature of the present invention may be stated in general terms as including the provision of a consumable titanium electrode for the production of titanium ingots by using titanium scrap of various sizes, shapes and character, said scrap being packed in an elongated can or container of titanium sheet material held in place by radially disposed wedges driven through the sides of the can and into the mass of scrap, whereby said titanium scrap is formed into a unitary consumable titanium electrode for use in the production of titanium ingots; and the provision of a method of making consumable titanium electrodes for the production of titanium ingots, using titanium scrap of various sizes, shapes and character, packing said scrap in an elongated can of titanium sheet material, cutting or punching slots around the sides of the can throughout its length, and driving wedges of titanium sheet or plate material through said slots and substantially radially into the mass of titanium scrap to hold the same in place to form a consumable titanium electrode.

Referring now to the accompanying drawing which is illustrative of preferred embodiments of the present invention, and in which like numerals refer to similar parts throughout the several views:

Fig. 1 is a longitudinal sectional view through a consumable titanium electrode formed in accordance with the invention;

Fig. 2 is a perspective view of an electrode embodying the invention, showing the titanium scrap packed in a cylindrical can;

Fig. 3 is a transverse sectional view through an electrode such as shown in Fig. 2, showing the manner in which the wedges hold the scrap material in the can; and Fig. 4 is a perspective view showing the exterior of an electrode embodying the invention, illustrating the use of a square cross-section can for containing the scrap material.

In carrying out the invention, miscellaneous titanium scrap of various sizes, shapes and character, such as sheet or plate shearings and punchings, chips, skulls and the like, are formed into consumable electrodes for use in the production of titanium ingots.

These pieces of titanium scrap, as indicated at 10, are packed into an elongated can formed of titanium sheet material, as indicated at 11 in Fig. 1. This can may be of any desired cross-sectional shape to conform to the shape of the consumable electrode furnace in which it is intended to use the completed electrode, for instance the can may be of cylindrical form as indicated at 11a in Figs. 2 and 3, or of square cross section, as indicated at 11b in Fig. 4.

These pieces of miscellaneous titanium scrap may be packed as tightly as possible into the can, substantially filling the same from the closed lower end 12 to the open upper end 13 thereof. Since the titanium scrap used for this purpose consists of pieces of various sizes and shapes, a substantially solid mass may be formed, as the smaller pieces of scrap will fill the spaces and crevices between larger pieces.

For the purpose of holding this mass of scrap in place in the can, and preventing it from falling downward out of the can when the same is in use as a consumable electrode in a furnace, transversely disposed holding means is provided.

To this end, slots are cut or punched around the side walls of the can, from one end thereof to the other, as indicated at 14, and tapered spikes or wedges 15 of titanium sheet or plate material are inserted through these slots and driven substantially radially into the interior of the can.

As shown in the drawing, these spikes penetrate to the center of the mass of miscellaneous titanium scrap, at intervals throughout the length of the can, securely holding the scrap in place therein.

In order to reinforce the structure, and to assist in compacting and binding the titanium scrap within the can, straps 16 of titanium strip material may be bound circumferentially around the can, at intervals throughout its length, as shown in Fig. 4.

An electrode formed in this manner can be used preferably in the first stage step in an arc melting furnace for the production of titanium ingots. For such purpose, the cross-sectional dimensions of the can, in which the titanium scrap is packed, should be slightly less than the inner dimension of the furnace in which the electrode is used. The cross-section of the electrode is uniform throughout its length so that the sides of the electrode will not contact the sides of the furnace at any point during the melting operation. Such an electrode thus contains a very substantial amount of titanium scrap material.

Where consecutive ingots are to be produced having the same or substantially similar analysis it is, of course, desirable that titanium scrap of similar analysis be used. Thus, all of the assembled pieces of titanium in a given electrode including the can, the miscellaneous pieces of sheet scrap, chips, skulls and the like, the spikes and the straps, should all have the same analysis as the desired analysis of the ingot to be produced in the melt in which the given electrode is to be used. Thus, impurities are not introduced into subsequent melts, and the use of such an electrode provides a practical and economical manner in which to reclaim and utilize the valuable titanium scrap.

Accordingly, the present invention provides a titanium electrode and method for manufacturing the same from titanium scrap, which permits the reclaiming and salvaging of miscellaneous kinds of titanium scrap of various sizes, shapes and character for the manufacture of titanium ingots, whereby such scrap is completely utilized.

Furthermore, the improved construction and method enables the production of a consumable titanium electrode formed of a plurality of scrap pieces which, by reason of their assembly, have sufficient electrical conductivity to permit the use of the electrode in a consumable electrode arc furnace for the production of titanium ingots.

Although the slots in the can for insertion of the spikes are shown in the drawings as located in spaced substantially horizontal rows, it should be understood that any other arrangement of these slots is within the scope of the invention. In some cases it is found desirable to locate these slots spirally around the can, from one end thereof to the other, and such slots have also been provided in a random arrangement over the entire can.

While the invention has been described above as for the manufacture of an electrode formed wholly of titanium, for the production of titanium ingots, it is pointed out that the invention has also been used in the production of ferro-titanium.

In such cases, the can is in the form of a relatively heavy iron or steel pipe, with the lower end closed as by an iron or steel disc welded thereto. The wall thickness of the iron or steel pipe may vary, depending upon the percentage of iron desired in the ingot to be produced. By this method ferro-titanium containing 30% iron has been satisfactorily made.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. The method of making a consumable electrode for the production of titanium ingots from titanium scrap, including the steps of providing an elongated sheet metal container having a closed lower end and an open upper end, cutting slots around all sides of the container from one end thereof to the other, packing the container with pieces of titanium scrap material of various shapes, sizes and character including sheet and plate shearings and punchings, chips and skulls, substantially entirely filling the container from the lower closed end to the upper open end thereof, and inserting substantially triangular spikes of titanium sheet and plate material through said slots radially of the container into the mass of scrap material to substantially the center thereof, throughout the length of the container, whereby said spikes lie in radial lines of the container and emanate substantially from a center.

2. A consumable electrode comprising an elongated metal container having a closed lower end and an open upper end, and having slots around all sides throughout its length, a mass of titanium scrap material of various sizes, shapes and character including sheet and plate shearings and punchings, chips and skulls packed within and substantially filling the container from the lower closed end to the upper open end thereof, and substantially triangular spikes of titanium sheet material inserted through said slots radially of the container and located within the mass of scrap material and extending substantially to the center thereof, said spikes being located within the mass of scrap material throughout the length of the container and lying in radial lines of the container emanating substantially from a center.

References Cited in the file of this patent

UNITED STATES PATENTS

| | | |
|---|---|---|
| 524,294 | Baugh | Aug. 7, 1894 |
| 1,646,395 | Field | Oct. 25, 1927 |
| 2,599,427 | Bellingher | June 3, 1952 |
| 2,792,621 | Howell | May 21, 1957 |